United States Patent
Miyashita et al.

(10) Patent No.: US 7,926,718 B2
(45) Date of Patent: Apr. 19, 2011

(54) OPERATION SUPPORT SYSTEM, OPERATION SUPPORT APPARATUS AND OPERATION SUPPORT METHOD

(75) Inventors: Takashi Miyashita, Kawasaki (JP); Taki Kono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 526 days.

(21) Appl. No.: 12/044,700

(22) Filed: Mar. 7, 2008

(65) Prior Publication Data

US 2008/0223917 A1    Sep. 18, 2008

(30) Foreign Application Priority Data

Mar. 13, 2007  (JP) ................................. 2007-064024

(51) Int. Cl.
*G06K 7/00* (2006.01)
(52) U.S. Cl. .................... 235/435; 235/436; 235/494
(58) Field of Classification Search .................. 235/435, 235/436, 494
See application file for complete search history.

(56) References Cited

U.S. PATENT DOCUMENTS

2006/0237546 A1* 10/2006 Lapstun et al. ............... 235/494

FOREIGN PATENT DOCUMENTS

| JP | 10-2708 | 1/1998 |
| JP | 2003-281297 | 10/2003 |

* cited by examiner

*Primary Examiner* — Michael G Lee
*Assistant Examiner* — Kristy A Haupt
(74) *Attorney, Agent, or Firm* — Staas & Halsey LLP

(57) ABSTRACT

An operation support system, method and apparatus that transmit operation information indicating an operation to an operator and supports the operation. The system includes a reading unit that reads, from a plurality of codes affixed to parts, position information of the codes. The system also includes a calculation unit that calculates a positional relationship between the codes. The system also includes a transmission unit that transmits the operation information, based on the position information read by the reading unit, and on the positional relationship calculated by the calculation unit.

9 Claims, 11 Drawing Sheets

FIG. 3

- PART ID
- CODE ID
- DISPLAY QR CODE SIZE (mm)
- POSITION INFORMATION (TOP AND BOTTOM, LEFT AND RIGHT, FRONT AND BACK, ETC.)

FIG. 5

| PART ID | CODE ID | CODE SIZE | POSITION INFORMATION |
|---|---|---|---|
| 120 | 1 | 1 × 1 | FRONT CENTER |
| 120 | 2 | 1 × 1 | FRONT TOP RIGHT |
| 120 | 3 | 1 × 1 | FRONT BOTTOM LEFT |
| 120 | 4 | 3 × 2 | RIGHT SIDE CENTER |
| 120 | 5 | 2 × 2 | FRONT BOTTOM RIGHT |
| 130 | 6 | 1 × 1 | FRONT TOP |
| 130 | 7 | 1 × 1 | FRONT BOTTOM |

FIG. 6

| CODE ID | CODE SIZE | POSITION INFORMATION |
|---|---|---|
| 1 | 1 × 1 | PART 120 FRONT CENTER |
| 2 | 1 × 1 | PART 120 FRONT TOP RIGHT |
| 3 | 1 × 1 | PART 120 FRONT BOTTOM LEFT |
| 4 | 3 × 2 | PART 120 RIGHT SIDE CENTER |
| 5 | 2 × 2 | PART 120 FRONT BOTTOM RIGHT |
| 6 | 1 × 1 | PART 130 FRONT BOTTOM |
| 7 | 2 × 2 | PART 130 FRONT TOP |

FIG. 10

- OPERATOR NUMBER

- OPERATING JIG NUMBER

- POSITION INFORMATION (TOP AND BOTTOM, LEFT AND RIGHT, FRONT AND BACK, ETC.)

FIG. 11

| NUMBER | 1 | 2 | 3 | 4 | 5 | 6 |
|---|---|---|---|---|---|---|
| ACTION | HOLD OBJECT | HORIZONTALLY MOVE OBJECT | ROTATIONALLY MOVE OBJECT | MOVE OBJECT NEARER TO INSTALLATION LOCATION | INSTALL OBJECT IN INSTALLATION LOCATION | RELEASE OBJECT |
| PRECONDITION | PRECONDITION: CONDITION OF "RELEASE OBJECT" | PRECONDITION: | PRECONDITION: | PRECONDITION: | PRECONDITION: CONDITION OF "HOLD OBJECT" | PRECONDITION: CONDITION OF "HOLD OBJECT" OR "INSTALL OBJECT IN INSTALLATION LOCATION" |
| ACTION DETERMINATION METHOD | DETERMINATION: DETERMINE, FROM POSITIONAL RELATIONSHIP BETWEEN CODE OF HAND AND CODE OF OBJECT, THAT OBJECT IS BEING HELD | DETERMINATION: FIND CODE OF HAND OR CODE OF OBJECT, AND DETERMINE THAT OBJECT IS MOVING HORIZONTALLY AS SEEN FROM VISUAL POINT OF CAMERA | DETERMINATION: FIND CODES AT BOTH ENDS OF OBJECT, AND ASCERTAIN CONDITION OF RELATIVE ROTATION FROM INITIAL SETTING POSITION | DETERMINATION: MEASUR DISTANCE FROM RELATIVE POSITIONAL RELATIONSHIP BETWEEN POSITION OF CODE OF OBJECT, OR CODE OF HAND, AND CODE OF INSTALLATION LOCATION, AND RECOGNIZE THAT OBJECT IS MOVED NEARER | DETERMINATION: MEASURE DISTANCE FROM RELATIVE POSITIONAL RELATIONSHIP BETWEEN CODE OF OBJECT AND CODE IN INSTALLATION POSITION, AND DETERMINE WHETHER OR NOT OBJECT IS INSTALLED | DETERMINATION: DETERMINE IN THE EVENT THAT DISTANCE IN RELATIVE POSITIONAL RELATIONSHIP BETWEEN CODE OF OBJECT AND CODE OF HAND INCREASES |

OPERATION SUPPORT SYSTEM, OPERATION SUPPORT APPARATUS AND OPERATION SUPPORT METHOD

CROSS-REFERENCE TO RELATED APPLICATIONS

This application is related to and claims the benefit of priority from the prior Japanese Patent Application No. 2007-64024, filed on Mar. 13, 2007, the entire contents of which are incorporated herein by reference.

BACKGROUND

Field

The present invention relates to an operation support system, an operation support apparatus, and an operation support method that read data from codes affixed to parts, transmit operation information relating to an operation to an operator, and support the operation.

SUMMARY

According to an aspect of an embodiment, an apparatus includes a reading unit that reads, from a plurality of codes affixed to parts, position information of the codes, a calculation unit that calculates a positional relationship between the codes, and a transmission unit that transmits the operation information, based on the position information read by the reading unit, and on the positional relationship calculated by the calculation unit.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a table illustrating information stored in two-dimensional codes;

FIG. 5 is a table illustrating an example code information memory;

FIG. 6 is a table illustrating an example positional relationship memory;

FIG. 10 is a table illustrating example information stored in a two-dimensional code affixed to a glove; and FIG. 11 is a table illustrating an example operation determination method.

DETAILED DESCRIPTION OF THE PREFERRED EMBODIMENTS

An operation support apparatus 1 according to an example embodiment can read data from two-dimensional codes affixed to parts, and transmit detailed operation instruction information relating to an operation to an operator, thereby supporting the operation.

Figure 1:
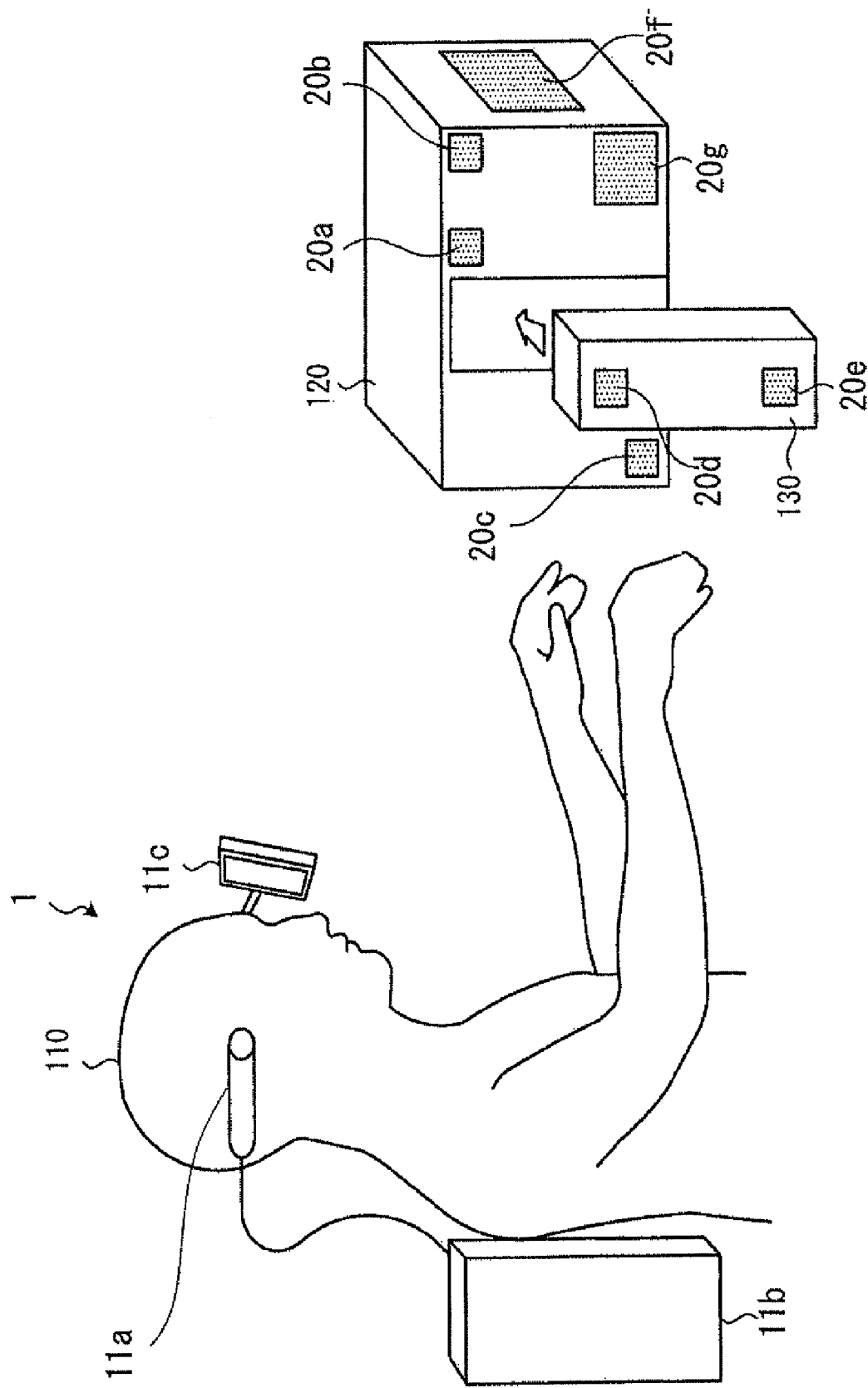
FIG. 1 illustrates a diagram illustrating an operation support apparatus 1 according to an example embodiment.

FIG. 1 is a diagram illustrating an operation support apparatus according to an example embodiment.

As illustrated in FIG. 11 the operation support apparatus 1 can include a headset video camera 11a, a control terminal 11b and a headset wearable display 11c. A plurality of example two-dimensional codes 20a to 20g are affixed to a part 120 and a part 130. Two-dimensional code position information is recorded in advance in the two-dimensional codes 20a to 20g. The position information is information indicating correct positions of the actual two-dimensional codes storing the position information.

With this kind of configuration, the operation support apparatus 1 reads the position information in the two-dimensional codes 20a to 20g from the plurality of two-dimensional codes 20a to 20g affixed to the parts. The headset video camera 11a of the operation support apparatus 1 films images of the two-dimensional codes 20a to 20g affixed to the part 120 and the part 130, and the operation support apparatus 1 reads the position information in the two-dimensional codes 20a to 20g from the filmed images of the two-dimensional codes 20a to 20g. To describe with a specific example, the operation support apparatus 1 reads position information "part 130 front top" from the two-dimensional code 20d, and reads position information "part 130 front bottom" from the two-dimensional code 20e.

Subsequently, the operation support apparatus 1 calculates a positional relationship between the two-dimensional codes 20a to 20g. The operation support apparatus 1 identifies the positions of the two-dimensional codes 20a to 20g from the images filmed by the headset video camera 11a, and calculates the positional relationship between the two-dimensional codes 20a to 20g. As an example, the operation support apparatus 1 calculates a positional relationship in which the two-dimensional code 20d is positioned at the front top of the part 130 with respect to the two-dimensional code 20e, and the two-dimensional code 20e is positioned at the front bottom of the part 130 with respect to the two-dimensional code 20d.

Then, the operation support apparatus 1 can compare the position information in, and the positional relationship between, the plurality of two-dimensional codes 20a to 20g, and transmits operation information to an operator 110. The operation support apparatus 1 can compare the position information, read from the plurality of two-dimensional codes 20a to 20g, and the calculated positional relationship between the two-dimensional codes 20a to 20g, and determine whether they match. Then, in the event that the position information recorded in the two-dimensional codes matches the calculated positional relationship, the operation support apparatus 1 can determine that positions, orientations and directions in which the parts are installed are correct, and can display the fact that the installation is correct on the headset wearable display 11c.

In an event that the position information stored in the two-dimensional codes does not match the calculated positional relationship, the operation support apparatus 1 can determine that the positions, orientations and directions in which the parts are installed are wrong and, as well as displaying the fact that the installation is wrong on the headset wearable display 11c, can display the correct installation.

As an example, the position information in the two-dimensional code 20d being "part 130 front top", and the position information in the two-dimensional code 20e being "part 130 front bottom", as the filmed images show that the two-dimensional code 20d is positioned above the two-dimensional code 20e, and the two-dimensional code 20e is positioned below the two-dimensional code 20d, the operation support apparatus 1 can determine that the position information recorded in the two-dimensional codes matches the calculated positional relationship, and can display the fact that the installation is correct on the headset wearable display 11c.

In this way, the operation support apparatus 1, as a result of recognizing a direction and orientation of a part, or a positional relationship with a two-dimensional code of another part, can transmit detailed operation instructions to the operator.

Figure 2:
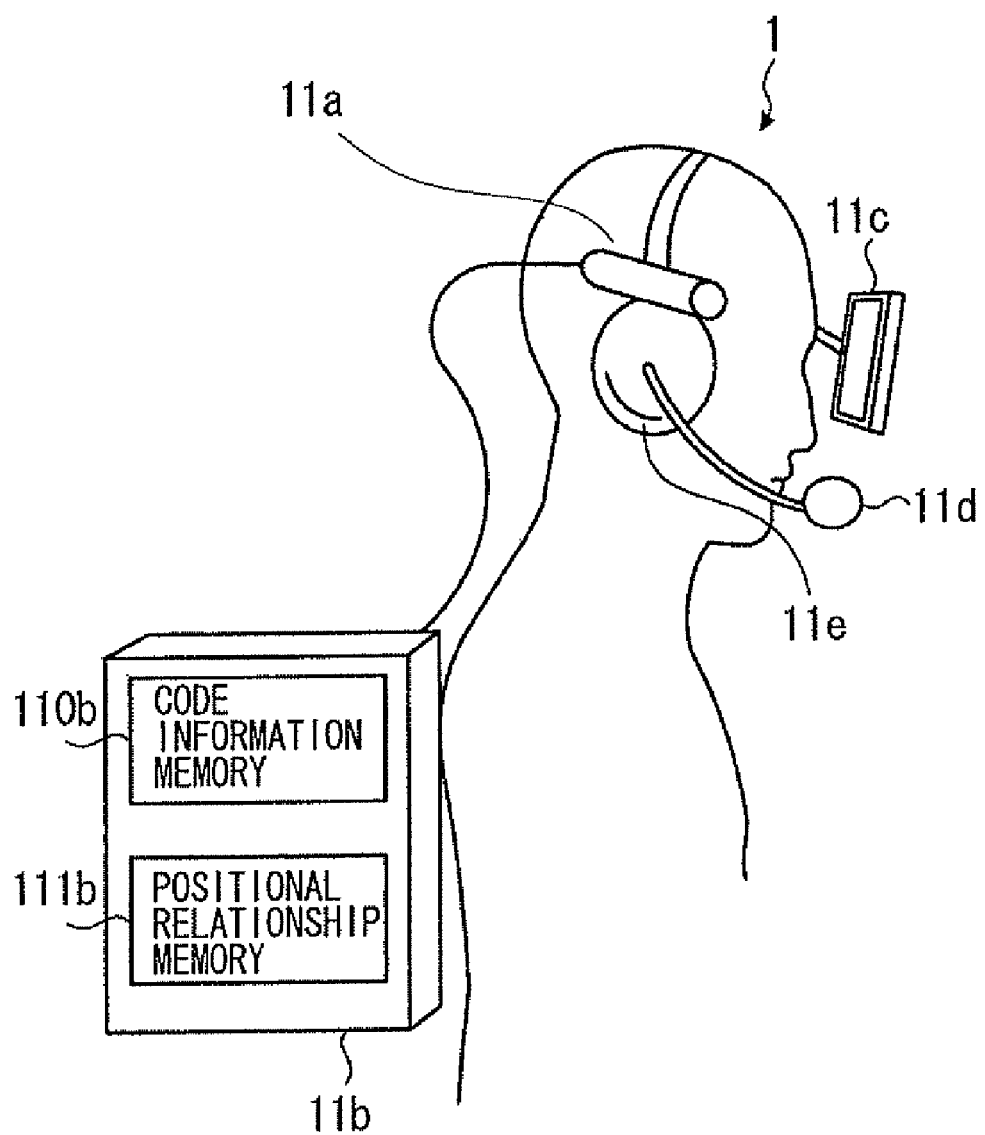
FIG. 2 is a block diagram illustrating a configuration of the operation support apparatus 1 according to the example embodiment.

FIG. 2 is a block diagram illustrating a configuration of the operation support apparatus 1 according to an example embodiment. It is also acceptable to arrange in such a way that the operation support apparatus 1 is connected to an unshown server via a wired or wireless network.

As illustrated in FIG. 2, this operation support apparatus 1 includes a headset video camera 11a, a control terminal 11b, a headset wearable display 11c, a headset microphone 11d and a headset speaker 11e. Hereafter, a description will be given of a process of each component. The headset video camera 11a corresponds to a "reading unit" described in the claims, the control terminal 11b to a "calculation unit", and the headset wearable display 11c to a "transmission unit".

The headset video camera 11a reads the position information in the two-dimensional codes 20a to 20g from the plurality of two-dimensional codes 20a to 20g affixed to the parts. The headset video camera 11a, on filming the images of the two-dimensional codes 20a to 20g affixed to the part 120 and the part 130, reads the information in the two-dimensional codes 20a to 20g from the filmed images of the two-dimensional codes 20a to 20g, and transmits it to the control terminal 11b, to be described hereafter. It is also acceptable to arrange in such a way that images of operation contents filmed by the headset video camera 11a are saved as data (for example, a text).

FIG. 3 is a table illustrating information recorded in the two-dimensional codes.

As illustrated in FIG. 3, each two-dimensional code 20a to 20g records a "part ID" which uniquely identifies a part, a "code ID" which uniquely identifies a two-dimensional code, a "code size" which indicates a size of a two-dimensional code, and "position information" which indicates a position in which a two-dimensional code is installed (for example, top and bottom, left and right, front and back, etc.). Some parts having an edged portion, a high voltage area or the like, in the event that there is a support method which is safe and easy to operate in mounting a part, it is also acceptable to arrange in such a way as to record that fact in the two-dimensional code.

Figure 4:
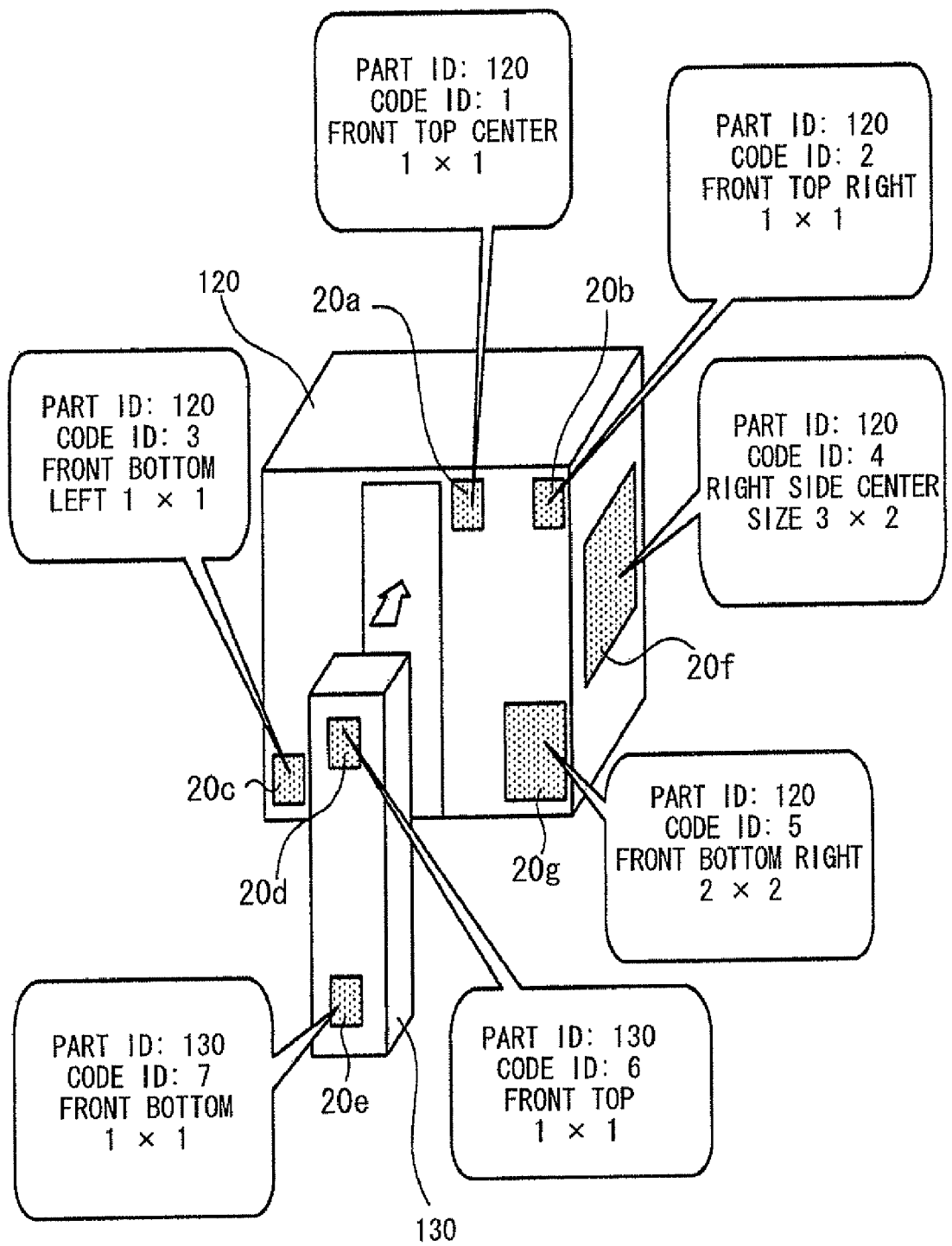
FIG. 4 is a block diagram illustrating an example of information stored in the two-dimensional codes.

FIG. 4 is a diagram illustrating a specific example of information stored in the two-dimensional codes.

As illustrated in FIG. 4, information indicating that the part ID is "130", the code ID is "6", the position information is "130 front top", and the code size is "1×1" is stored in the two-dimensional code 20d of the part 130, while information indicating that the part ID is "130", the code ID is "7", the position information is "130 front bottom", and the code size is "1×1" is stored in the two-dimensional code 20e.

Returning to the description of FIG. 2, the control terminal 11b, including a code information memory 110b (to be described in detail hereafter using FIG. 5), which stores the information read from the two-dimensional codes, and the positional relationship memory 111b (to be described in detail hereafter using FIG. 6), which stores the positional relationship between the two-dimensional codes, calculates the positional relationship between the two-dimensional codes 20a to 20g.

The control terminal 11b identifies the positions of the two-dimensional codes 20a to 20g from the images filmed by the headset video camera 11a, and calculates the positional relationship between the two-dimensional codes 20a to 20g. As an example, the operation support apparatus 1 calculates the positional relationship in which the two-dimensional code 20d is positioned at the front top of the part 130 with respect to the two-dimensional code 20e, and the two-dimensional code 20e is positioned at the front bottom of the part 130 with respect to the two-dimensional code 20d.

Subsequently, the control terminal 11b compares the position information, read from the plurality of two-dimensional codes 20a to 20g, and the calculated positional relationship between the two-dimensional codes 20a to 20g, and can determine whether they match. Then, the control terminal 11b notifies the headset wearable display 11c of a result thereof.

The code information memory 110b stores the information read by the headset video camera 11a. The code information memory 11b stores the "part ID" which uniquely identifies each part, the "code ID" which uniquely identifies a two-dimensional code, the "code size" which indicates a size of a two-dimensional code, and the "position information" which indicates a position in which a two-dimensional code is installed (for example, top and bottom, left and right, front and back, etc.), correlated to each other, as illustrated in FIG. 5.

The positional relationship memory 111b stores the positional relationship between the two-dimensional codes. The positional relationship memory 111b stores the "code ID", the "code size" and the "positional relationship" indicating the positional relationship between the codes, correlated to each other, as illustrated in FIG. 6.

Figure 7:
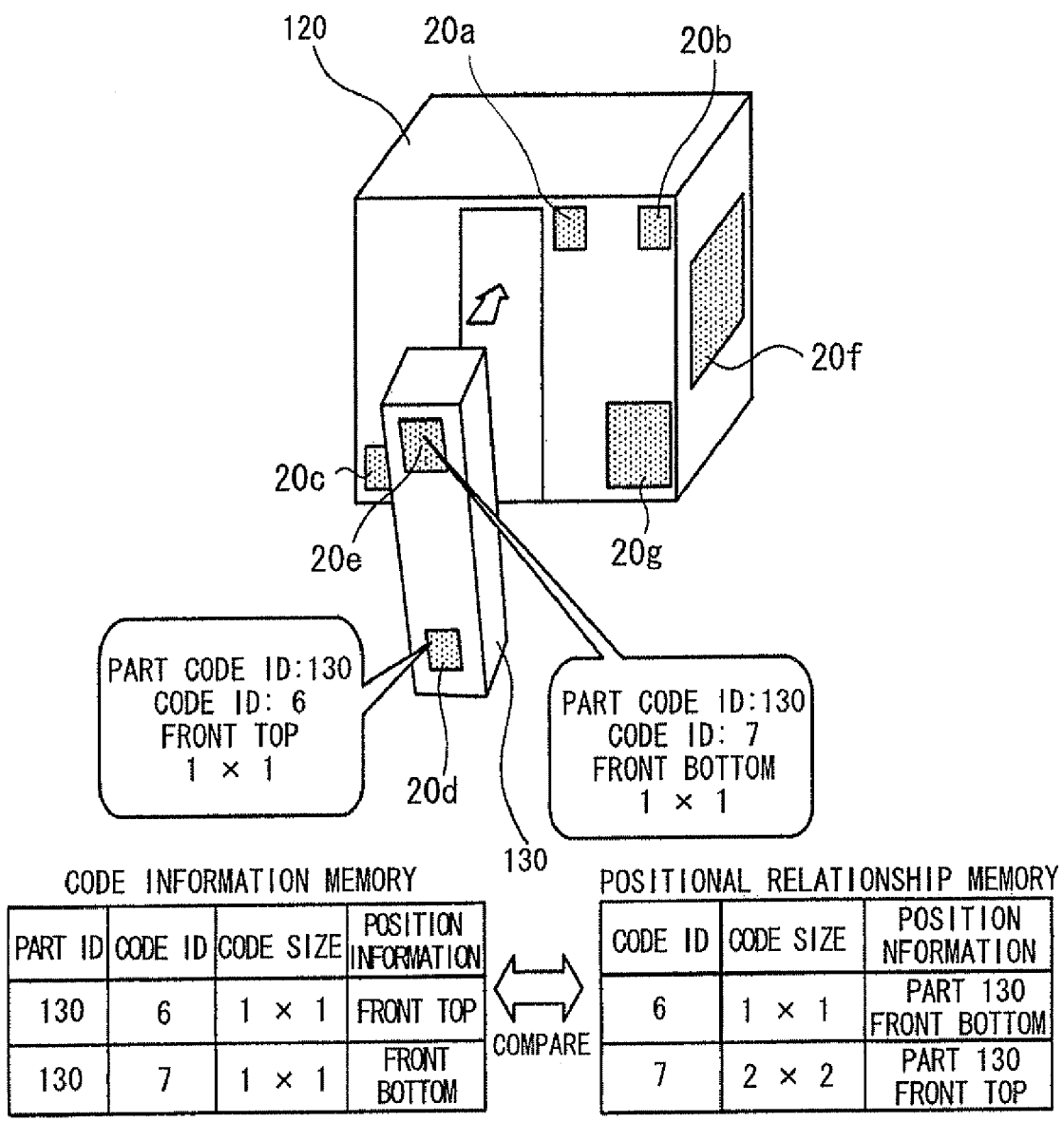
FIG. 7 is a block diagram illustrating an example operation determination process by a control terminal 11b.

Her An example operation determination process by the control terminal 11b will be described in conjunction with FIG. 7. As illustrated in FIG. 7, the information indicating that the part ID is "130", the code ID is "6", the position information is "130 front top", and the code size is "1×1" is stored in the two-dimensional code 20d of the part 130. The information indicating that the part ID is "130", the code ID is "7", the position information is "130 front bottom", and the code size is "1×1" is stored in the two-dimensional code 20e. The control terminal 11b receives such information from the headset video camera 11a, and stores it in the code information memory 110b.

The control terminal 11b calculates the code size "1×1" and the positional relationship "part 130 front bottom" of the two-dimensional code 20d (the code ID "6"), and the code size "2×2" and the positional relationship "part 130 front top" of the two-dimensional code 20e (the code ID "7"), from the images filmed by the headset video camera 11a, and stores them in the positional relationship memory 111b.

Then, the control terminal 11b compares the information stored in the code information memory 110b, and the information stored in the positional relationship memory 111b. That is, to describe using the example illustrated in FIG. 7, the control terminal 11b compares the position information "130 front top", and the positional relationship "part 130 front bottom", of the two-dimensional code 20d. As a result thereof in the event that the position information stored in the two-dimensional code does not match the calculated positional relationship, the control terminal 11b can notify the headset wearable display 11c of an instruction to display the fact that the installation is wrong, and can cause it to display "turn part 130 upside down".

Also, in the event that the code size "1×1" of the two-dimensional code 20e (the code ID "7") stored in the code information memory 110b does not match the code size "2×2" of the two-dimensional code 20e (the code ID "7") stored in the positional relationship memory 111b, the control terminal 11b, as well as notifying the headset wearable display 11c of an instruction to display the fact that the installation is wrong, can cause it to display "part 130 wrongly inclined".

Returning to the description of FIG. 2, the headset wearable display 11c, based on the instruction received from the control terminal 11b, transmits the operation information to the operator 110. The headset wearable display 11c, as well as displaying the fact that the installation is correct, or the fact that the installation is wrong, can display the correct installation (for example, "turn part 130 upside down").

The headset microphone 11d transmits sound data on a sound uttered by the operator to the unshown server via the unshown wired or wireless network. The headset speaker 11e, based on the calculated positional relationship between the codes, notifies the operator 110 of the operation information by a sound.

Figure 8:
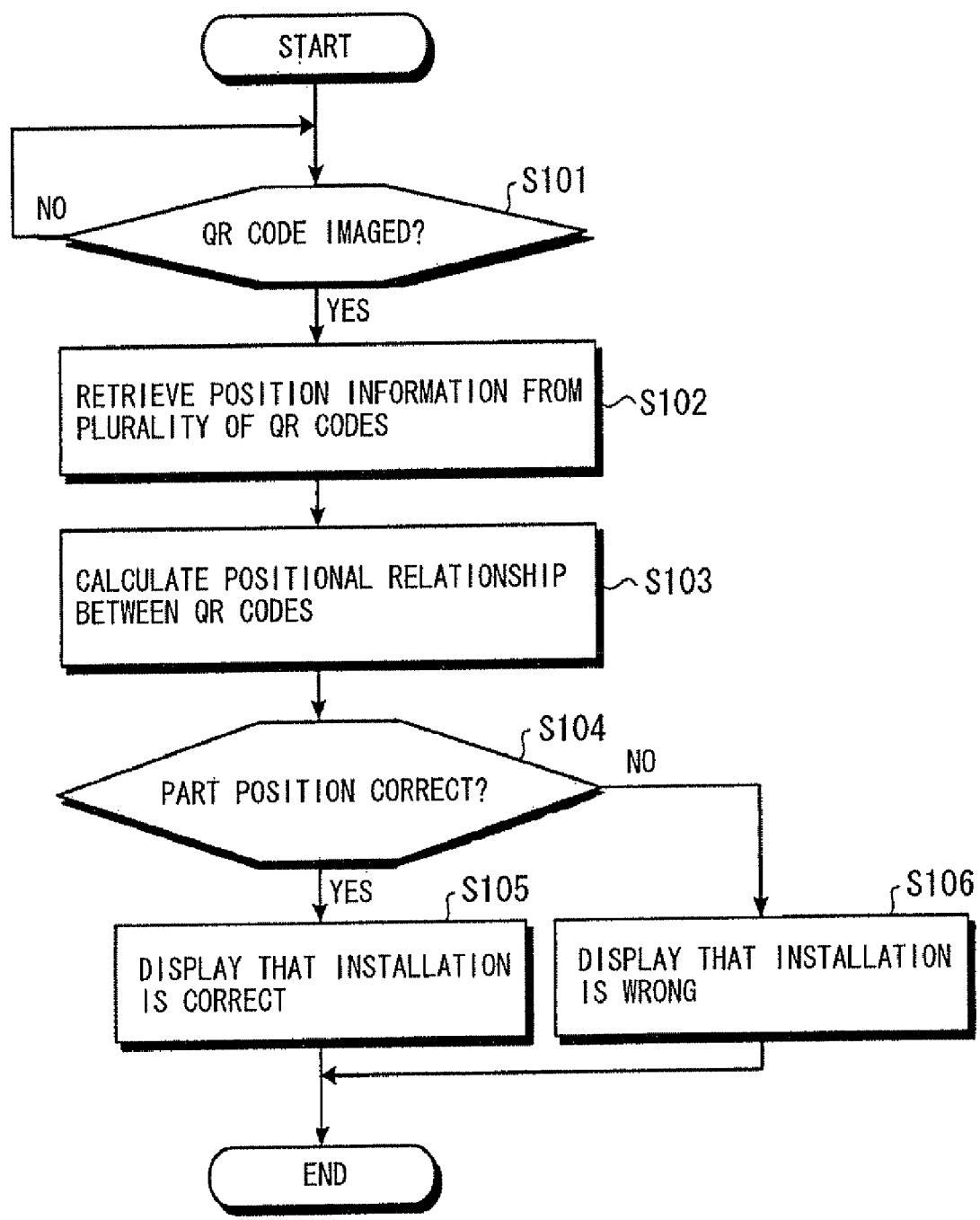
FIG. 8 is a flowchart illustrating an example process operation of the operation support apparatus 1 according to the example embodiment.

Next, a description will be given, using FIG. 8, of an example process by the operation support apparatus 1 according to the example embodiment. FIG. 8 is a flowchart illustrating an example a process operation of the operation support apparatus 1 according to the example embodiment.

As illustrated in FIG. 8, the headset video camera 11a of the operation support apparatus 1, on filming the images of the two-dimensional codes 20a to 20g affixed to the part 120 and the part 130 (operation S101 affirmative), reads the information in the two-dimensional codes 20a to 20g from the filmed images of the two-dimensional codes 20a to 20g, and transmits it to the control terminal 11b, to be described hereafter (operation S102).

Then, the control terminal 11b identifies the positions of the two-dimensional codes 20a to 20g from the images filmed by the headset video camera 11a, and calculates the positional relationship between the two-dimensional codes 20a to 20g (operation S103). The headset wearable display 11c compares the position information, read from the plurality of two-dimensional codes 20a to 20g, and the calculated positional relationship between the two-dimensional codes 20a to 20g, and can determine whether they match (operation S104).

As a result thereof, if the installation is correct (operation S104 affirmative), the headset wearable display 11c can display the fact that the installation is correct (operation S105). If the installation is wrong (operation S104 negative), the headset wearable display 11c, as well as displaying the fact that the installation is wrong, can display the correct installation (operation S106).

As described heretofore, an example operation support apparatus 1 reads the position information in the two-dimensional codes from the plurality of two-dimensional codes affixed to the parts, calculates the positional relationship between the two-dimensional codes and, based on the read position information and the calculated positional relationship, transmits the operation information, it is possible, as a result of recognizing a direction or orientation of a part, or a positional relationship with another part, to transmit the detailed operation instructions to the operator.

Also, according to the example embodiment, as the operation support apparatus 1 reads one or a plurality of the information relating to the direction of each code, the information relating to the orientation of each two-dimensional code, and the information relating to the size of each two-dimensional code, from the plurality of two-dimensional codes, it is possible, as a result of recognizing a more detailed positional relationship between the parts to which the two-dimensional codes are affixed, to transmit more detailed operation instructions.

In the example embodiment, a description is given of a case of reading the data in the two-dimensional codes affixed to the parts to be operated but, the embodiments invention not being limited to this, it is also acceptable to arrange in such a way as to affix a two-dimensional code to a glove of the operator, and read data in the two-dimensional code.

Therefore, in a following example embodiment, as a case of reading the two-dimensional code affixed to the glove of the operator, inferring an operation condition, and supporting the operation, a description will be given, using FIGS. 9 to 11, of an outline and features of an operation support apparatus 1a in the example embodiment.

Figure 9:
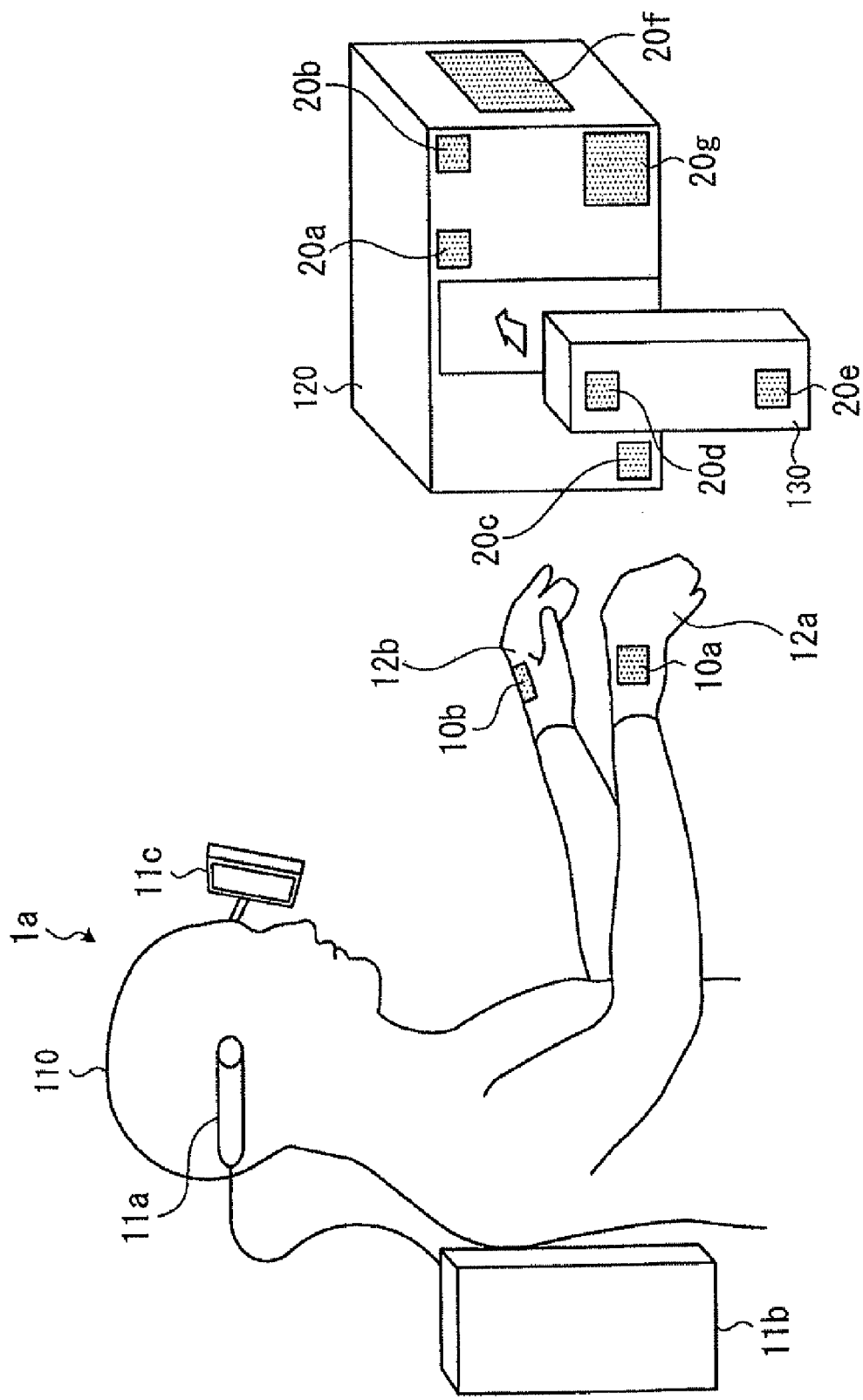
FIG. 9 is a block diagram illustrating an outline and features of an operation support apparatus 1a according to another example embodiment.

FIG. 9 is a diagram illustrating operation support apparatus 1a according to the example embodiment. FIG. 10 is a diagram illustrating example information stored in the two-dimensional code affixed to the glove. FIG. 11 is a diagram for illustrating an example operation determination method.

As illustrated in FIG. 9, in the operation support apparatus 1a, unlike the first example embodiment as well as the plurality of two-dimensional codes 20a to 20g being affixed to the part 120 and the part 130, two-dimensional codes 10a and 10b are also affixed to gloves 12a and 12b, respectively.

As illustrated in FIG. 10, each of the two-dimensional codes 10a and 10b affixed to the gloves 12a and 12b can store s an operator number which uniquely identifies the operator, an operating jig number which uniquely identifies a jig used by the operator, and position information indicating a position of a glove (for example, top and bottom, left and right, front and back, etc.).

Then, the operation support apparatus 1a reads the glove position information from the two-dimensional codes 10a and 10b affixed to the gloves 12a and 12b of the operator, and calculates a positional relationship between the parts and the gloves 12a and 12b.

The operation support apparatus 1a can determine, from a positional relationship between a glove (in FIG. 11, described as a "hand") and a part (in FIG. 11, described as an "object"), what operation (in FIG. 11, described as "action") the operator is carrying out, as illustrated in FIG. 11. The operation support apparatus 1a can determine, for example, from a positional relationship between a code of the hand and a code of the object, whether the object is being held. That is, in the event that a distance between the hand and the object is close to zero, and both are moving together, the operation support apparatus 1a can determine that the hand is holding the object.

Then, the operation support apparatus 1a, based on the positional relationship between the parts, can transmit the operation information to the operator. The operation support apparatus 1a can determine whether the operation determined from the positional relationship between the parts is correct. As a result thereof in the event that the installation is correct, the operation support apparatus 1a can display the fact that the installation is correct on the headset wearable display 11c, while in the event that the installation is wrong, the operation support apparatus 1a, as well as displaying the fact that the installation is wrong on the headset wearable display 11c, supports the operation of the operator 110.

In this way, in the example embodiment, as the operation support apparatus 1a, as well as reading the position information in the two-dimensional codes from the plurality of two-dimensional codes affixed to the parts, reads the glove position information from the two-dimensional codes affixed to the gloves of the operator, calculates the positional relationship between the two-dimensional codes and the gloves and, based on the read two-dimensional code and glove position information, and on the calculated positional relationship between the two-dimensional codes and the gloves, transmits the operation information, it is possible to, for example, infer a kind of the operation from motions of the gloves and the positional relationship between the parts, and transmit a more appropriate operation to the operator.

Other embodiments can be implemented.

In the example embodiment, a description is given of a case in which one two-dimensional code is affixed to each of the gloves 12a and 12b of the operator but, the embodiments are not limited to this, it is also acceptable to arrange in such a way that a plurality of the two-dimensional codes are affixed to each of the gloves 12a and 12b. For example, two-dimensional codes are affixed one to each finger, a positional relationship between the two-dimensional codes is acquired, and motions of the fingers in the operation are also inferred.

In this way, as the plurality of two-dimensional codes are affixed to each of the gloves 12a and 12b, it is possible to infer the kind of the operation in more detail from the motions of the fingers of the gloves, and transmit a more appropriate operation to the operator.

Also, the components of each apparatus illustrated in the figures are functionally conceptual, and are necessarily physically configured as illustrated in the figures. That is, specific aspects of a separation or combination of the components in each example apparatus are not limited to those illustrated in the figures, it is possible to configure each apparatus by functionally or physically separating or combining all or some of the components in optional units in accordance with various loads, usages or the like. For example, the headset video camera 11a and the control terminal 11b can be combined. Furthermore, all, or one optional portion, of processing functions carried out in each apparatus can be carried out by a CPU and a program analyzed and executed by the CPU, and as wired logic hardware.

Also, among the processes described in the example embodiments, it is also possible to manually carry out all or some of the processes described as being automatically carried out, or it is also possible to automatically carry out all or some of the processes, described as being manually carried out, by a heretofore known method. Apart from this, it is possible to The embodiments can optionally change the processing procedures, control procedures, applications, and information including various data and parameters, as described except where otherwise specified. For example, the information recorded in the two-dimensional codes.

The operation support method described in the example embodiments can be realized by a computer, such as a personal computer or a work station, executing a program prepared in advance. The program can be distributed via a network such as an internet. Also, the program can also be recorded on a computer readable recording medium, such as a hard disk, a flexible disk (FD), a CD-ROM, an MO or a DVD, and executed by being read from the recording medium by the computer.

Although a few embodiments have been illustrated and described, it would be appreciated by those skilled in the art that changes may be made in these embodiments without departing from the principles and spirit of the invention, the scope of which is defined in the claims and their equivalents.

What is claimed is:

1. An operation support system which transmits operation information indicating an operation to an operator, and supports the operation, comprising:
   a reading unit that reads, from a plurality of codes affixed to parts, position information of the codes;
   a calculation unit that calculates a positional relationship between the codes; and
   a transmission unit that transmits the operation information, based on the position information read by the reading unit, and on the positional relationship calculated by the calculation unit.

2. The operation support system of claim 1, wherein
   the reading unit reads, from the plurality of codes, one or a plurality of information relating to a direction of each code, information relating to an orientation of each code, and information relating to a size of each code.

3. The operation support system of claim 1, wherein
   the reading unit, as well as reading, from the plurality of codes affixed to the parts, the position information of the codes, reads position information of a glove of the operator from a code affixed to the glove,
   the calculation unit calculates a positional relationship between the codes and the glove, and
   the transmission unit transmits the operation information, based on the position information of the codes, and the position information of the glove, read by the reading unit, and on the positional relationship between the codes and the glove, calculated by the calculation unit.

4. An operation support apparatus that transmits operation information indicating an operation to an operator, and supports the operation, comprising:
   a reading unit that reads, from a plurality of codes affixed to parts, position information of the codes;
   a calculation unit that calculates a positional relationship between the codes; and
   a transmission unit that transmits the operation information, based on the position information read by the reading unit, and on the positional relationship calculated by the calculation unit.

5. The operation support apparatus of claim 4, wherein
   the reading unit reads, from the plurality of codes, one or a plurality of information relating to a direction of each code, information relating to an orientation of each code, and information relating to a size of each code.

6. The operation support apparatus of claim 4, wherein
   the reading unit, as well as reading, from the plurality of codes affixed to the parts, the position information of the codes, reads position information of a glove of the operator from a code affixed to the glove,
   the calculation unit calculates a positional relationship between the codes and the glove, and
   the transmission unit transmits the operation information, based on the position information of the codes, and the position information of the glove, read by the reading unit, and on the positional relationship between the codes and the glove, calculated by the calculation unit.

7. An operation support method that transmits operation information indicating an operation to an operator, and supports the operation, comprising:
   reading from a plurality of codes affixed to parts, position information of the codes;
   calculating a positional relationship between the codes; and transmitting the operation information, based on the position information read by the reading, and on the positional relationship calculated by the calculating.

8. The operation support method of claim 7, wherein
the reading reads, from the plurality of codes, one or a plurality of information relating to a direction of each code, information relating to an orientation of each code, and information relating to a size of each code.

9. The operation support method of claim 7, wherein
the reading, as well as reading, from the plurality of codes affixed to the parts, the position information of the codes, reads position information of a glove of the operator from a code affixed to the glove, the calculating calculates a positional relationship between the codes and the glove, and the transmitting transmits the operation information, based on the position information of the codes, and the position information of the glove, read by the reading, and on the positional relationship between the codes and the glove, calculated by the calculating.

* * * * *